United States Patent
Han et al.

(10) Patent No.: US 7,146,525 B2
(45) Date of Patent: Dec. 5, 2006

(54) METHOD FOR BACKING UP AND RECOVERING DATA IN THE HARD DISK OF A COMPUTER

(75) Inventors: Dong Han, Beijing (CN); Changqing Wan, Beijing (CN); Danfeng Zhang, Beijing (CN)

(73) Assignee: Legend (Beijing) Limited, Beijing (CN)

( * ) Notice: Subject to any disclaimer, the term of this patent is extended or adjusted under 35 U.S.C. 154(b) by 130 days.

(21) Appl. No.: 10/488,117

(22) PCT Filed: Aug. 31, 2001

(86) PCT No.: PCT/CN01/01298

§ 371 (c)(1),
(2), (4) Date: Sep. 10, 2004

(87) PCT Pub. No.: WO03/050683

PCT Pub. Date: Jun. 19, 2003

(65) Prior Publication Data

US 2005/0015652 A1    Jan. 20, 2005

(51) Int. Cl.
    *G06F 11/00*    (2006.01)
(52) U.S. Cl. ............................................. 714/6
(58) Field of Classification Search .................. 714/6
    See application file for complete search history.

(56) References Cited

U.S. PATENT DOCUMENTS

| | | | | |
|---|---|---|---|---|
| 5,544,347 A * | 8/1996 | Yanai et al. | ................. | 711/162 |
| 5,708,769 A * | 1/1998 | Stallmo | ......................... | 714/6 |
| 5,764,903 A * | 6/1998 | Yu | ............................. | 709/208 |
| 5,819,310 A * | 10/1998 | Vishlitzky et al. | .......... | 711/114 |
| 5,857,208 A * | 1/1999 | Ofek | .......................... | 707/204 |
| 5,887,128 A * | 3/1999 | Iwasa et al. | ................... | 714/6 |
| 5,987,566 A * | 11/1999 | Vishlitzky et al. | .......... | 711/114 |
| 6,023,780 A * | 2/2000 | Iwatani | ....................... | 714/770 |
| 6,070,249 A * | 5/2000 | Lee | ................................. | 714/6 |
| 6,154,854 A * | 11/2000 | Stallmo | ......................... | 714/6 |
| 6,195,695 B1 * | 2/2001 | Cheston et al. | ............. | 709/221 |
| 6,233,696 B1 * | 5/2001 | Kedem | .......................... | 714/6 |
| 6,430,663 B1 * | 8/2002 | Ding | ........................... | 711/162 |
| 6,587,935 B1 * | 7/2003 | Ofek | ........................... | 711/162 |
| 6,711,660 B1 * | 3/2004 | Milne et al. | ................. | 711/173 |
| 6,785,838 B1 * | 8/2004 | Lim et al. | ...................... | 714/7 |
| 6,792,556 B1 * | 9/2004 | Dennis | ........................... | 714/6 |
| 6,845,466 B1 * | 1/2005 | Gold | .............................. | 714/7 |

(Continued)

FOREIGN PATENT DOCUMENTS

CN    1173669 A    2/1998

(Continued)

*Primary Examiner*—Scott Baderman
*Assistant Examiner*—Brian Assessor
(74) *Attorney, Agent, or Firm*—RatnerPrestia

(57) ABSTRACT

A method of backing up and recovering data in the hard disk of a computer, comprising a step of backing up data in the hard disk, including: allocating a mirror partition in a hard disk for backing up the data in a partition of the hard disk where the data need to be backed up are stored; backing up integrally the data in the backed up partition specified by the user into the allocated corresponding mirror partition; and hiding the space of the mirror partition; the method further comprising a recovery step for recovering integrally the hard disk data in the mirror partition into the corresponding backed up partition according to the instruction of the user. The present invention can back up and recovery all kinds of data in the hard disk safely and reliably.

16 Claims, 3 Drawing Sheets

U.S. PATENT DOCUMENTS

| | | | |
|---|---|---|---|
| 7,000,142 B1 * | 2/2006 | McCombs | 714/6 |
| 2002/0103966 A1 * | 8/2002 | Wu et al. | 711/114 |
| 2003/0074600 A1 * | 4/2003 | Tamatsu | 714/6 |
| 2004/0193950 A1 * | 9/2004 | Gagne et al. | 714/6 |
| 2005/0081091 A1 * | 4/2005 | Bartfai et al. | 714/6 |

FOREIGN PATENT DOCUMENTS

| | | |
|---|---|---|
| CN | 1310389 A | 8/2001 |
| TW | 337011 A | 7/1998 |

* cited by examiner

METHOD FOR BACKING UP AND RECOVERING DATA IN THE HARD DISK OF A COMPUTER

TECHNICAL FIELD

The present invention relates to a method of backing up and recovering data stored in a hard disk of a computer.

BACKGROUND ART

Hard disks as the most commonly used external storage devices of computers have been used for storing large amount of user data and system information, thus the security and reliability thereof are very important. While the misoperation of the user, defects of management software of hard disk data and the attacks of the computer viruses may destroy useful data on the hard disks. Some of the boot type viruses may further destroy the parameter file on the hard disk, causing the software system of computer breaking down and unable to start normally. Therefore it is necessary to make a back-up copy of the hard disk data.

A hard disk rescue card is used for backing-up the hard disk data in the prior art, which is usually mounted on an extension slot or external extension interface of the computer, corresponding parameters shall be set and an installation program shall be run after the mounting of the rescue card, thus system resources shall be occupied. If the software therein is to be upgraded, then the ROM chip for storing the software in the card and the installation program shall be upgraded as well, thus causing inconvenience. In addition the maintenance of the hardware become complicated. Since part of the program and parameters of such rescue card are stored in the operating system of the hard disk, if the hard disk is damaged due to virus or other causes, the rescue card will loss its functions. Furthermore, an ordinary rescue card may only protect one hard disk, and it is possible to be inconsistent with the mother board of the computer, therefore the effect of the hard disk rescue card is limited, and the security and reliability of the hard disk data can not be protected perfectly.

SUMMARY OF THE INVENTION

It is an object of the present invention to provide a method of backing-up and recovering data in the hard disk of a computer, which can back up and recover the data on the hard disk safely and reliably, and the damaged hard disk data due to the misoperation of the user or the affection of various viruses and the like can be recovered rapidly, conveniently and reliably, The technical solutions of the present invention are as follows:

A method of backing-up and recovering the data in the hard disk of a computer according to the present invention, comprises:

(1) a back-up step for backing up the hard disk data, including:

(a) allocating a mirror partition in a hard disk for backing up the data in a partition of the hard disk where the data required to be backed up are stored; the size of the space of the mirror partition may equal to that of the backed up partition, or no less than the size of the backed up partition, wherein the size of the backed up partition may be specified by the user;

(b) backing up integrally the data in the backed up partition specified by the user into the allocated corresponding mirror partition; and (c) hiding the space of the mirror partition;

(2) a recovery step for recovering integrally the hard disk data in the mirror partition into the corresponding backed up partition according to the instruction of the user.

The above mentioned back-up and recovery steps may be implemented in the start-up procedure after power-on or resetting of the computer. The software for implementing the present invention may also be run and implemented at other times during the running of the computer, In each start-up procedure of the computer, the user may execute those two steps or one of them on demand.

In the present invention, the system main bootstrap record (MBR) and the system bootstrap record (PBR) on the hard disk may be backed up, and a modification flag may be set in the main bootstrap record and system bootstrap record. The modification flag is used for monitoring and determining whether the data of the records have been modified.

In the present invention, said recovery step may further comprise: detecting the modification flag bit in the system main bootstrap record (MBR) and system bootstrap recode (PBR) on the hard disk, respectively, when it is detected and determined that the system main bootstrap (MBR) and the system bootstrap record (PBR) have been damaged, they will be recovered automatically by using the backed up system main bootstrap record (MBR) and the system bootstrap record (PBR), and the file allocation table FAT 1 is restored by using the file allocation table FAT 2. The premise for the implementation of the restoration of the file allocation table is that the table FAT 2 is integral and undamaged.

In an embodiment of the present invention, the hiding of the mirror partition is implemented by modifying the number of sectors of the hard disk in the hard disk parameter table FDPT. The hiding of the mirror partition is implemented by hiding the hard disk sectors of the mirror partition. Practically, the hiding of the hard disk sectors can also be implemented by other methods, such that ordinary user operating system applications and computer viruses can not access the mirror partition, and thus the object of protecting the backed up data of the hard disk can be achieves. The procedure of hiding the mirror partition is usually automatically implemented by software after the creation of the mirror partition.

In an embodiment of the present invention, the hiding of the backed up partition may be implemented by modifying the number of sectors of the hard disk partitions in the hard disk parameter table (FDPT). The protection of the hard disk data can also be implemented in this manner. For example, the sum of the numbers of sectors of all the mirror partitions is subtracted from the actual total number of sectors. Thus any unauthorized user is unable to access the hidden partitions.

In the present invention, the system configuration data stored in the computer may be backed up on the hard disk based on the specification of the user, for example, backing up the system configuration information saved in the CMOS RAM (complementary metal-oxide-semiconductor memory) of the computer.

In an embodiment of the present invention, the hard disk data are backed up from the backed up partition into the mirror partition or recovered from the mirror partition to the backed up partition in the data back-up or recovery, the data transmission mode thereof may employ the programmable input/output (PIO) access mode, or the direct memory access (DMA) mode.

In an embodiment of the present invention, the data on a number of hard disks connected to the computer may be backed up or recovered.

In the present invention, the backed up partition and its corresponding mirror partition may be allocated in the spaces of different hard disks connected to the computer. Therefore, when the backed up partition and the mirror partition occupy, respectively, the whole spaces of respective hard disks, mutual copying back-up of two hard disks can be implemented, that is, a hard disk is used as a complete mirror backing up of another hard disk for copying all the data on whole hard disk. While the space of the mirror partition may not less than that of the backed up partition.

In an embodiment of the present invention, said back-up step or recovery step is initiated by pressing a preset hot key on the keyboard by the user within a predetermined period of time in the start-up procedure after the power-on or resetting of the computer.

In order to start the method of the present invention during the start-up procedure of the computer, several hot keys may be set in advance. When a user presses a different hot key, an interface of different language of the started back-up step or recovery step is display on the display of the computer, for example, a Chinese interface or English interface may be entered by pressing different hot keys. Interfaces of other languages may be provided as well for users speaking different languages.

In an embodiment of the present invention, an attribute of the partition may be set by the user for inhibiting or allowing rewriting the main bootstrap record of the hard disk. The partition attribute, as a flag bit for inhibiting or allowing the rewriting of the main bootstrap record, can be utilized for protecting the main bootstrap record from being unauthorizedly and maliciously modified (such as the effect of computer viruses), and without any influence on the operations of the installation of new system by the user and the like. When this flag bit is set to "disable", any overwriting on the main bootstrap record is inhibited, so that the main bootstrap sector has the function of write prevention; when this flag bit is set to "enable", the main bootstrap record is allowed to be overwritten legally, e.g., overwriting the main bootstrap record at the time of installation of a new operating system by the user. If the above mentioned modification flag in the main bootstrap record is modified, it can be determined that the modification is malicious.

In the present invention, the backed up system main bootstrap record (MBR), system bootstrap record (PBR), system configuration data, the hard disk partition information data and mirror partition information data may be stored in the hard disk space external to the space managed by the hard disk partition manager, such that ordinary users and computer viruses are unable to read and write those data, thus the backed up data can be protected effectively.

If it is discovered that the respective flag bits in the system main bootstrap record (MBR), system bootstrap record (PBR), system configuration data, the hard disk partition information data and mirror partition information data have been unauthrizedly rewritten, the backed up copy of the above mentioned data are restored automatically before system bootstrap. Some of the important data (e.g., user passwords and the like) can be backed up and their overwriting can be monitored according to requirements, such that they can be recovered immediately and automatically once any malicious overwriting being discovered.

The method of the present invention may be implemented by the system BIOS (basic input/output system) program stored on the ROM chip in the mother board of the computer.

The method of the present invention may be implemented in the start-up procedure after the power-on or resetting of the computer system. In the start-up procedure, an active partition (also called an activated partition) may be set by the user in the partition provided with different operating system on the hard disk.

The basic principle of the present invention is to partition a space of the same size on the same hard disk or another hard disk as the hard disk partition required to be backed up, which is called a mirror partition, and the data in the backed up partition are integrally copied into its respective mirror partition to achieve the object of safe back-up. The mirror partition as a reserved space of the hard disk has not been reported to operating system, and thus can not be accessed by the operating system, therefore, the security and reliability of the backed up data stored in the mirror partition can be enhanced. The only drawback of the present invention is that some of the hard disk space shall be occupied, however, s hard disk technology has been developing rapidly, the capacity of the hard disk becomes large and larger, and the cost is decreasing. A user may purchase large capacity hard disks, therefore, a user will not be subject to inconvenience for insufficient hard disk space due to the application of the present invention. In addition, it is worthwhile for data security to lose a small portion of spaces of the hard disk capacity without increasing the cost.

The present invention provides the user with reliable hard disk data back-up and data recovery and back-up and recovery of CMOS configured information, and provides multiple bootstrap function that is easy to configure, enabling the user to install multiple operating systems that can be started up by simple and fast settings; it is more precious for the present invention to possess immunity to various viruses of the bootstrap type and CIH and the like of very strong damaging power, the backed up data and records can be recovered rapidly, reliably and completely and any damage to the user data and system information by the viruses can be completely removed; it is a complete solution to protect against the CIH virus, in combination with the anti-virus write protecting function of the dual BIOS (FLASH ROM) carried by the mother board per se. In addition, the software program for implementing the present invention is fully built in the BIOS chip, without occupying the hard disk, memory or any system resource; there is no influence on the performance of the system. It is a preferred choice of the protection tools of the business computers and personal computers, especially for those users of relatively high requirements on the security and reliability of hard disk data.

The hard disk partition can be fully backed up and recovered in the manner of mirror image according to the present invention, even the records hidden in a partition will not be lost. The user may even undelete a newly deleted file before back-up; and such back-up and recovery are not subject to limit on the operating system. The computer software according to the present invention is fully built in the BIOS and stored in the BIOS chip, without occupying any hard disk space; no other medium is required in the whole installation procedure, and it is very hard to be destroyed. At the same time, the compatibility of the present invention with the computer can be enhanced and the upgrade of software can be implemented easily. In an embodiment, the space occupied by the mirror partition is hidden by modifying the FDPT (Fixed Disk Parameter Table), i.e., the pseudo-interrupt 41h/46h, so as to ensure the security and reliability of the backed up data. There is no temporarily resident memory. Prior to each start-up of the computer, important data areas on the hard disk (e.g., the main bootstrap partition and the system bootstrap partition) are tested by the method of the present invention, if those important data are damaged, they can be recovered automatically by the backed up data previously stored in the mirror partition of the hard disk. If the fixed disk file allocation table FAT is damaged, it can be recovered as well. In an embodiment, further functions of the method of the present invention include the data back-up and recovery functions of CMOS and the multi bootstrap function of the disk partitions. At most four operating systems can be installed on one hard disk and can be switched conveniently, without the need to restart the system. The function of converting an extension partition into a primary partition has also been provided in order to implement multi-bootstrap. The present invention can automatically recognize and prompt for the recovery of the previous installation. The operations of the method of the present invention are simple and convenient, and the speed of operating is fast, and two different interfaces of the Chinese and English language can be displayed by pressing different hot keys (e.g. two hot keys corresponding to the English interface are set additionally). Running password can be set for the software of the present invention to prevent the hard disk partitions and the mirror partition from unauthorized overwriting, the password is stored on the hard disk, no one can remove it by removing the CMOS, thus the security is high.

BRIEF DESCRIPTION OF FIGURES

Preferred embodiments of the present invention will be further described with reference to the accompanying drawings.

DETAILED DESCRIPTION OF PREFERRED EMBODIMENTS

A typical embodiment of the present invention is a software system for backing up hard disk data developed by the applicant for personal computers, and it is used for protecting the data or materials on the hard disk from loss or being affected by viruses. It is built in the BIOS system codes using the build-in-BIOS technology, that is all the functions of the present invention, including the programs for partitioning, backing up and recovering are stored on the BIOS chip, without occupying the hard disk space, memory and system resources. Therefore, it is compatible with various computer mother boards and applicable to various operating systems, and no additional floppy disk or plug-in card is required. The user needs not to install any software. It is also very convenient to upgrade the software, which can be done by downloading a current version of the BIOS from the Internet. This embodiment supports all types of IDE hard disks. The basic flow and function according to the embodiment will be described with respect to FIGS. 1–3.

The BIOS (basic input/output system) is a low level software system which communicates directly with the hardware of the computer, provides the basic functions for controlling the hardware devices for the operating system. The BIOS is stored in a read only memory chip, the codes thereof will not vanish even if the computer is shut down or power-off. Preferably, the BIOS is stored in a Flash memory (high speed erasable and writable memory) chip.

Figure 1:
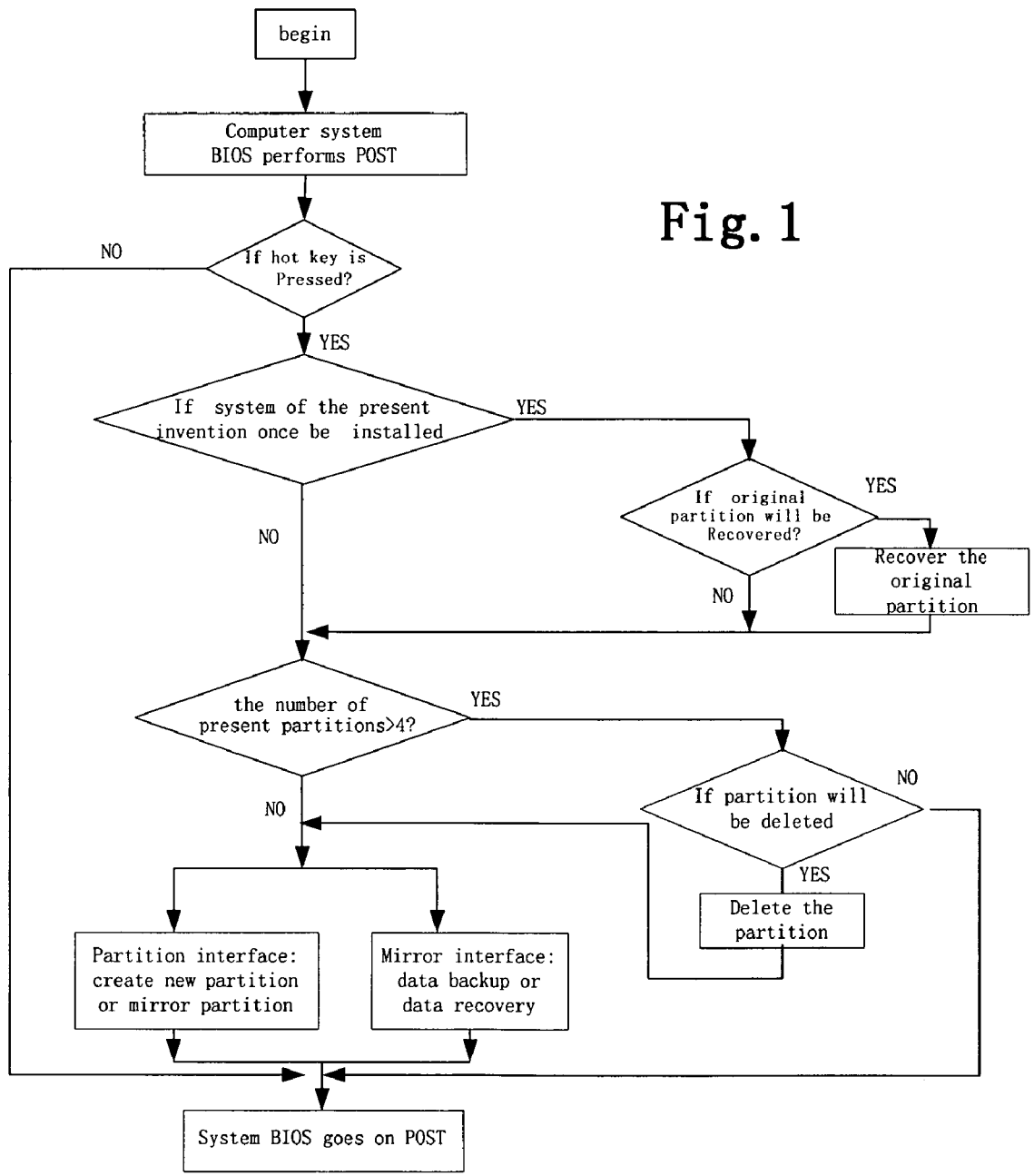
FIG. 1 is a flow chart of the operation of an embodiment of the present invention.
Figure 2:
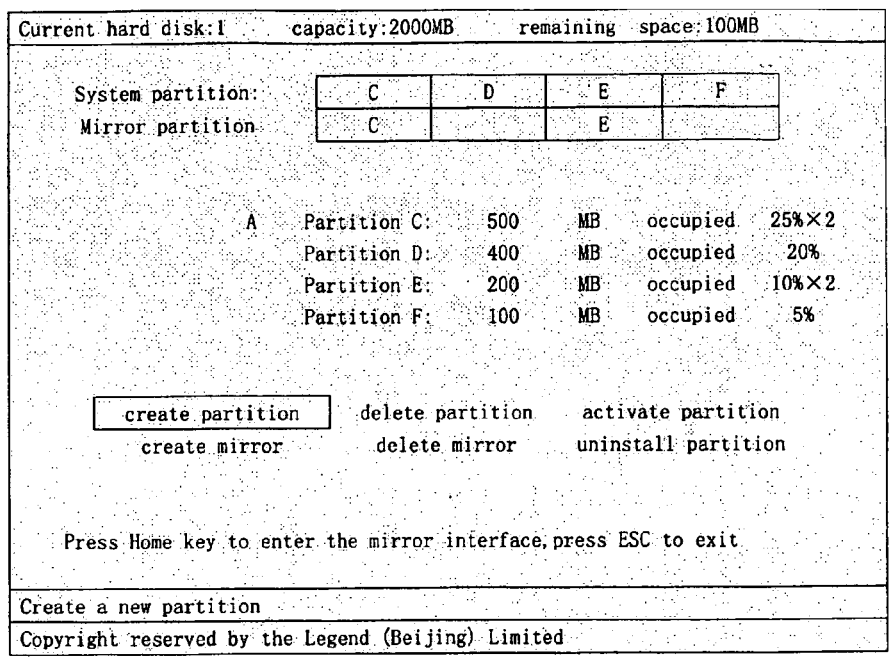
FIG. 2 is a schematic of the "partition interface" during the operation of the hard disk partition according to an embodiment of the present invention.
Figure 3:
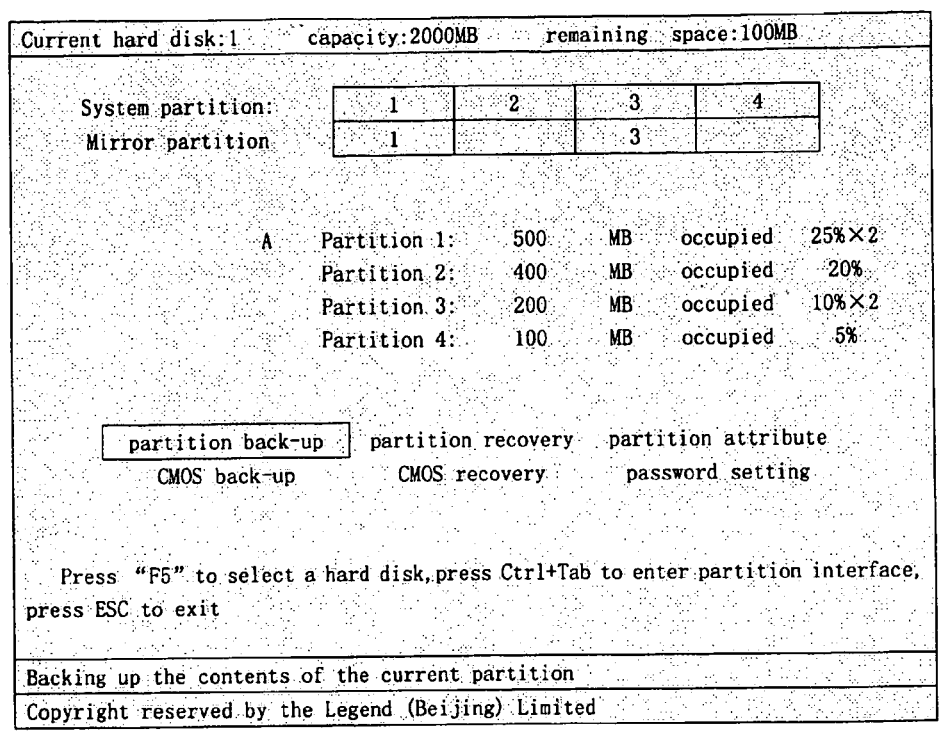
FIG. 3 is a schematic diagram of "mirror interface" during the operation of data recover and back-up according to an embodiment of the present invention.

Referring to FIG. 1, when the computer is started up or reset, the system BIOS performs power-on self test (POST), including testing whether the critical devices exist and work normally, performing security test on the hard disk, initializing power-on bootstrap, configuring the system according to the settings of the CMOS, reporting the hardware system configuration table to the operating system, and getting ready to hand over system control to the operating system. In this embodiment, two hot keys are set for users in the BIOS start-up procedure, including "Ctrl+Tab" keys and "Home" key. "Ctrl+Tab" keys are pressed to enter the partition interface for implementing the "hard disk partition" function (including creating a new partition and a mirror partition), as shown in FIG. 2. The "Home" key is pressed to enter the mirror interface for implementing the "partition mirror" function (including data back-up and data recovery), as shown in FIG. 3. When a user has fulfilled the back-up or recovery function according to the present invention or exits therefrom with a user interrupt, the power-on self test procedure is continued under control of the system BIOS.

It shall be understood by those skilled in the art that the starting up of the software for implementing the functions of the present invention can be activated by other manners, instead of hot keys. For example, an option can be set in the configuration interface of the CMOS and can be clicked by the user for activating the functions of the present invention.

The mother board of LEGEND computer can be provided with the functional software according to the embodiment of the present invention. By the software, hard disk data can be backed up, protected and recovered immediately, so as to protect important materials from being lost. In addition, the CMOS data can also be protected and recovered in the embodiment of the present invention. Since the software of the embodiment of the present invention are built in the BIOS, once the computer enters the BIOS start-up step, it may enter the software interface of the embodiment of the present invention and the user may select whether the system disk or data disk is to be backed up. The software selects an area on the hard disk for storing the backed up material, and thereafter this area may not be accessed by other software or hardware, including viruses. For example, when the system disk is attacked by virus, important data have been lost, and the operating system can not work at all, the backed up material can be recovered into the system disk by the use of the software system of the present invention, and then the user computer can work normally again. The software according to the present invention is also of very strong anti-virus function, and can exclude any virus from the back-up partition. If the invincible lock function (it is mainly used to protect the physical storage media, such as the FLASH ROM, of the BIOS from being maliciously attacked by virus) developed by the Legend QDI is added thereon, then the attack by viruses (such as CIH virus) can be avoided by the embodiment of the present invention. Unlike an ordinary rescue card which can protect only one hard disk, up to four hard disks can be protected by the embodiment of the present invention.

When the software system of the present invention runs on a user computer for the first time, the program analyzes the original partition system on the hard disk, and displays the conditions of the first four partitions. If extension partitions exist on the original hard disk and the number of those partitions is more than four, the system will prompt the user to delete the remaining partitions. The reason is that each hard disk may support no more than four main partitions. If the number of partitions is no more than four, the system will prompt the user to determine whether the system is to be installed and run on the basis of the original partitions. This will convert the original extension partitions into normal partitions, and will possibly alter the order of the disk identifiers of the partitions, but without altering the contents of the original partitions. The system will provide another solution to be selected by the user, that is, deleting all the original partition records and providing a fully clear hard disk space, but the user shall note that this may cause the missing of all the original data.

FIG. 2 lists all the functions included in the "partition interface", wherein the box "create a new partition" is used to create a new partition. After selecting the function, the system will prompt the user whether a mirror shall be set for the current partition, if so, the size of the partition may be input. The prompted maximum allocable space at this time will be one half of the remaining space, because a mirror partition of the same size shall be partitioned on the hard disk for the new partition. In addition, the capacity of the hard disk reported to the operating system shall be reduced accordingly. The box "delete a partition" in FIG. 2 is used to delete the last partition and its mirror partition of the existing partitions. In order to ensure the continuity of the hard disk space, only the last partition is allowed to be deleted, The box "activate a partition" in FIG. 2 is used for the user to select one partition from a plurality of installed operating system partition according to the requirements, and to set it to an active partition so as to implement the multiple bootstrap function. For example, the partitions C and D on the hard disk are installed with a Chinese Windows 98 and an English Windows 95 system, respectively, and a user may select C or D as an active partition to start up a corresponding system. Referring to FIG. 2, the "A" marked on the left side of the "partition C" indicates that partition C has been activated (set to an active partition). The box "create a mirror" is used to add a mirror for one of the existing partitions that have no mirror, unless the available space of the hard disk is insufficient. Corresponding mirror partitions have been created for the partitions C and E in the figure. The box "delete a mirror" is used to delete the mirror of a partition that has a mirror. In order to ensure the continuity of the hard disk space, only the mirror of the last partition which has a mirror is allowed to be deleted, The box "uninstall software" is used to uninstall the program of the present invention. The uninstalling procedure can be done immediately after the confirmation of the user.

When a user has entered the partition interface shown in FIG. 2 or the mirror interface shown in FIG. 3, he can switch directly between these two interface by pressing the hot keys, such as "Home" key or "Ctrl+Tab" keys.

Referring to FIG. 3, the box "partition back-up" in this figure is used for backing up the contents of a partition designated by the user into its mirror partition. If this partition has been backed up previously, the system will display the time of the last back-up and prompt the user to confirm, and the data will be backed up previously, the system will display the time of the last back-up and prompt the user to confirm, and the data will be backed up after confirmation. The box "partition recovery" is used for restoring the contents of a mirror partition into its corresponding partition. For example, mirror partitions C' and E' have been created for partitions C and E in the existing partitions C, D, E and F, if the partition C is to be recovered, the content of mirror partition C' is restored into partition C. If there are more than two hard disks, the identifiers of the partitions are changed from C, D, E, F to 1, 2, 3, 4 for distinguishing, as shown in FIG. 3.

The execution of partition back-up or partition recovery may adopt the programmable input/output access (PIO) mode or the direct memory access (DMA) mode. When the PIO mode is adopted, the currently larger memory space can be sufficiently used as a buffer (the operating system has not been loaded into the memory yet at that time), since the running of the BIOS is in the power on self test (POST) stage at that time. A block of data of determined amount is read from the hard disk each time, without the need to find the tracks, and then it is placed in the memory. When the available memory space is fully occupied by data, the data in the memory are written into the mirror partition or back-up partition in blocks, thus the speed of data back-up or recovery can be increased. The copy speed in the present embodiment can be as high as 5M per second. The copy speed of data can be up to 100M per second theoretically if, for example, the ultra DMA mode is employed.

The setting of the "partition attribute" in FIG. 3 allows the partition attribute to be reset after the computer having entered the operating system. For example, this option can be set to "on" during the installation of the operating system or when the partition attributes are needed to modify (e.g., changing FAT 16 to FAT 32), this partition becomes a general purpose IDE device at that time, allowing unmalicious modification of the system attribute, for example, during the installation of the operating system, and the monitoring on the MBR is cancelled; and the MBR and PBR are automatically backed up after the installation of the system. When the partition attribute is set to "off", any overwriting operation on the partition attribute is inhibited. The box "CMOS back-up" shown in FIG. 3 is used for backing up the contents of CMOS into the hard disk. The configuration parameters of the memory, display card, hard disk, floppy disk drive, optical disk drive, serial communication port, parallel communication port, and other components in the computer system, and the setting information of the time, password, and etc are usually stored in the CMOS. The system will be unable to be started up once they are damaged. If the contents of CMOS are backed up according to the present invention, the system will be safe and reliable, and easy to be restored. The box "CMOS recovery" in FIG. 3 is used for restoring the backed up settings in the CMOS. The box "password setting" is used for setting the passwords for the user to enter the "partition interface" in FIG. 2 and the "mirror interface" in FIG. 3.

The first sector of track 0 on a hard disk is called MBR, and its size is 512 bytes. This area is divided into two portions. The first portion is the pre-boot area including 446 bytes; and the second portion is the partition table including 66 bytes. This area corresponds to a small program whose function is to determine which partition is marked as an active partition, then the boot area of that partition is read out and the codes in the area are executed. Once the data in that sector are damaged, the hard disk may be unable to start up.

According to the present invention, the files affected by viruses can be restored by the recovery of the mirror partition. On the other hand, the present invention has very strong defense ability against the bootstrap area viruses, and can also protect against the attacks of the CIH virus of very strong destructiveness. If a user computer is destroyed by the CIH virus, the method of the present invention can restore the main bootstrap record (MBR) of the main bootstrap sector and the bootstrap sector PBR of each of the partitions automatically and attempts to restore the file allocation table FAT before the bootstrap system is started up by the computer (according to the condition of destruction by the CIH virus, the CIH virus is activated usually on $26^{th}$ of every month, if the system can not be started up normally on that day, it shall be powered off immediately to reduce the destructiveness of the system), such that the system can be bootstrapped basically, this function is not possessed by the existing anti-virus software; then removing the virus by the use of the virus killing software. It is more reliable to use the partition recovery function of the present invention to restore the contents of the mirror partition into the backed up partition, but the premise is that the contents of the backed up partition has already been backed up into the mirror partition prior to affection by viruses.

What is claimed is:

1. A method of backing up and recovering data on hard disk of computer, comprising the following steps:
   (1) a back-up step for backing up the hard disk data, including:
   (a) allocating a mirror partition in a hard disk for backing up the data in a partition of the hard disk where the data needed to be backed up are stored;
   (b) backing up integrally the data from the backed up partition specified by the user into the allocated corresponding mirror partition; and
   (c) hiding the space of the mirror partition;
   (2) a recovery step for recovering integrally the hard disk data in the mirror partition into the corresponding backed up partition according to the instruction of the user;
   Wherein the back-up step further includes backing up a system main bootstrap record (MBR) and a system bootstrap record (PBR) on the hard disk and setting modification flags in the MBR and PBR, respectively.

2. The method according to claim 1, wherein said recovery step further includes detecting the modification flag bits in the system main bootstrap record MBR and the system bootstrap record PBR on the hard disk, respectively, wherein, when the system main bootstrap record (MBR) and the system bootstrap record (PBR) are determined to have been damaged, respectively, they are recovered automatically by the use of the backed up system main bootstrap record (MBR) and system bootstrap record (PBR), and a file allocation table FAT 1 is restored by the use of a valid file allocation table FAT 2.

3. The method according to claim 1, wherein, in said back-up step, the hiding of the mirror partition is implemented by modifying the number of sectors in the partitions of the hard disk in the hard disk parameter table (FDPT).

4. The method according to claim 1, further comprising hiding the hacked up partition by modifying the number of sectors of the hard disk partitions in the hard disk parameter table (FDPT).

5. The method according to claim 1, wherein said back-up step further includes the step of:
   backing up the system configuration data stored in the computer on the hard disk according to the instruction of the user.

6. The method according to claim 1, wherein, in said back-up step and said recovery step, the transmission mode of the back-up data and recovery data is a programmable input/output access (PlO) mode or a direct memory access (DMA) mode.

7. The method according to claim 1, wherein, data back-up or data recovery is performed for multiple hard disks connected to the computer.

8. The method according to claim 1, wherein the backed up partition and the corresponding mirror partition thereof are located in spaces of different hard disks of the computer.

9. The method according to claim 1, wherein said back-up step or recovery step is initiated by the user by pressing a preset hot key on the keyboard during a predetermined time interval in the start-up procedure after the power-on or resetting of the computer.

10. The method according to claim 9, wherein, multiple hot keys are preset, and, when different hot keys are pressed by the user, an interface of the initiated back-up step or recovery step is displayed on the display of the computer, and the interface is displayed in different languages.

11. The method according to claim 1, further comprising setting a partition attribute by the user to inhibit or allow the main bootstrap record of the hard disk to be overwritten.

12. The method according to claim 1, wherein, the backed up data are stored in hard disk spaces beyond the space manageable by the hard disk manager of the operating system.

13. The method according to claim 1, further comprising setting modification flag bits in the backed up data, wherein when it is discovered that the respective modification flag bits of the backed up data have been modified without permission, the backed up data of the respective data are restored automatically before system bootstrap.

14. The method according to claim 1, wherein each of the steps of the method is implemented by the system BIOS program stored in the ROM chip on the mother board of the computer.

15. The method according to claim 1, wherein said method is implemented in the procedure of start-up bootstrap after the power-on or resetting of the computer system.

16. The method according to claim 15, further comprising setting an active partition in the partitions on the hard disk provided with different operating systems.

* * * * *